US007811439B1

(12) United States Patent
Simmons et al.

(10) Patent No.: US 7,811,439 B1
(45) Date of Patent: Oct. 12, 2010

(54) CONCENTRATION AND SEPARATION OF BIOLOGICAL ORGANISMS BY ULTRAFILTRATION AND DIELECTROPHORESIS

(75) Inventors: Blake A. Simmons, San Francisco, CA (US); Vincent R. Hill, Decatur, GA (US); Yolanda Fintschenko, Livermore, CA (US); Eric B. Cummings, Livermore, CA (US)

(73) Assignee: Sandia Corporation, Livermore, CA (US)

( * ) Notice: Subject to any disclaimer, the term of this patent is extended or adjusted under 35 U.S.C. 154(b) by 1105 days.

(21) Appl. No.: 11/499,371

(22) Filed: Aug. 3, 2006

Related U.S. Application Data

(60) Provisional application No. 60/705,933, filed on Aug. 3, 2005.

(51) Int. Cl.
*G01N 27/26* (2006.01)
*B01D 63/00* (2006.01)

(52) U.S. Cl. .................................................... 204/643

(58) Field of Classification Search .................. 204/643
See application file for complete search history.

(56) References Cited

U.S. PATENT DOCUMENTS 7,547,526 B2 * 6/2009 Ladisch et al. ................ 435/30

OTHER PUBLICATIONS

Fintschenko, Y.; Simmons, B.A.; Lapizco-Encinas, B. H.; and Cummings, E.B.; "Insulating Post Electrodeless Dielectrophoresis for the Selective Concentration of Bacteria", 7th *International Conference on Miniaturized Chemical and Biochemical Analysis Systems*, Oct. 5-9, 2003, Squaw Valley, CA.

Hughes, M.P.; Morgan, H.; Rixon, F.J.; Burt, J.P.H.; and Pethig, R.; "Manipulation of herpes simplex virus type 1 by dielectrophoresis", *Biochimica et Biophysica Acta*, 1998, v. 1425, pp. 119-126.

Hughes, M.P.; Morgan, H.; and Rixon, F.J.; "Dielectrophoretic manipulation and characterization of herpes simplex virus-1 capsids", *European Biophysical Journal*, 2001, v.30, pp. 268-272.

Lapizco-Encinas, B.H.; Davalos, R.V.; Simmons, B.A.; Cummings, E.B., and Fintschenko, Y.; "An insulator-based (electrodeless) dielectrophoretic concentrator for microbes in water", *Journal of Microbiological Methods*, 2005, v.62, pp. 317-326.

(Continued)

*Primary Examiner*—Arun S Phasge
(74) *Attorney, Agent, or Firm*—Timothy P. Evans

(57) ABSTRACT

Disclosed is a method for monitoring sources of public water supply for a variety of pathogens by using a combination of ultrafiltration techniques together dielectrophoretic separation techniques. Because water-borne pathogens, whether present due to "natural" contamination or intentional introduction, would likely be present in drinking water at low concentrations when samples are collected for monitoring or outbreak investigations, an approach is needed to quickly and efficiently concentrate and separate particles such as viruses, bacteria, and parasites in large volumes of water (e.g., 100 L or more) while simultaneously reducing the sample volume to levels sufficient for detecting low concentrations of microbes (e.g., <10 mL). The technique is also designed to screen the separated microbes based on specific conductivity and size.

11 Claims, 7 Drawing Sheets

OTHER PUBLICATIONS

Lapizco-Encinas, B.H.; Simmons, B.A.; Cummings, E.B.; and Fintschenko; Y.; "High-Throughput Electrodeless Dielectrophoresis of Viruses in Polymeric Microdevices", *7th International Conference on Miniaturized Chemical and Biochemical Analysis Systems*, Oct. 5-9, 2003, Squaw Valley, CA.

Markx, G.H.; Dyda, P.A.; and Pethig, R.; "Dielectrophoretic separation of bacteria using a conductivity gradient", *Journal of Biotechnology*, 1996, v.51, pp. 175-180.

Markx, G.H.; Huang, Y.; Zhou, X-F.; and Pethig, R.; "Dielectrophoretic characterization and separation of micro-organisms", *Microbiology*, 1994, v.140, pp. 585-591.

Morgan, H; and Green, N.G.; "Dielectrophoretic manipulation of rod-shaped viral particles", *Journal of Electrostatics*, 1997, v. 42, pp. 279-293.

Simmons, B.A.; Lapizco-Encinas, B.H.; Shediac, R.; Hachman, J.; Chames, J.; Fiechtner, G.; Cummings, E.B.; and Fintschenko, Y.; "Polymeric Insulating Post Electrodeless Dielectrophoresis (EDEP) For the Monitoring of Water-Borne Pathogens", *Polymer Preprints*, 2004, v.45(1), pp. 527.

USEPA; "Method 1602: Male-specific ($F^+$) and Somatic Coliphage in Water by Single Agar Layer (SAL) Procedure", 2001, Office of Water, EPA 821-R-01-029.

USEPA; "EPA Guidance for Quality Assurance Project Plans", 1999, Office of Research and Development, EPA/600/R-98/018.

Arrowood, M. J. and Donaldson, K.; "Improved Purification Methods for Calf-Derived *Cryptosporidium parvum* Oocysts Using Discontinuous Sucrose and Cesium Chloride Gradients", *Journal of Eukaryotic Microbiology*, 1996, v.43(5), pp. S89.

Berman, D.; Rohr, M-E.; and Safferman, R.S.; "Concentration of Poliovirus in Water by Molecular Filtration", *Applied and Environmental Microbiology*, 1980, v. 40(2), pp. 426-428.

Betts, W.B.; and Brown, A.P.; "Dielectrophoretic analysis of microbes in water", *Journal of Applied Microbiology Symposium Supplement*, 1999, v.85, pp. 201S-213S.

Betts, W.B.; "The potential of dielectrophoresis for the real-time detection of microorganisms in food", *Trends in Food Science and Technology*, 1995, v.6, pp. 51-58.

Brown, A.P.; and Betts, W.B.; "A Dielectrophoresis System for Rapid Analysis of *Cryptosporidium Parvum", Royal Society of Chemistry Special Publications, International Conference on Cryptosporidium*, 2001, v.265, pp. 84-87.

Crane, J.S.; and Pohl, H.A.; "A Study of Living and Dead Yeast Cells Using Dielectrophoresis", *Journal of Electrochemistry Society*, 1968, v.115(6), pp. 584-586.

Cummings, E.B.; "A comparison of theoretical and experimental electrokinetic and dielectrophoretic flow fields," *22nd AIAA Aerodynamic Measurement Technology and Ground Testing Conference*, 2002, St. Louis, MO, Proceeding $32_{nd}$ AIAA, 2002-3193.

Green, N. G.; Morgan, H.; Milner, J. J.; "Manipulation and trapping of sub-micron bioparticles using dielectrophoresis", *Journal of Biochemical and Biophysical Methods*, 1997, v.35, pp. 89-102.

Malyan, B.; and Balachandran, W.; "Sub-micron sized biological particle manipulation," *Journal of Electrostatics*, 2001, v.51, pp. 15-19.

Oshima, K.H.; Evans-Strickfaden, T.T.; Highsmith, A.K.; and Ades, E.W.; "The removal of phages T1 and PP7, and poliovirus from fluids with hollow-fiber ultrafilters with molecular weight cut-offs of 50 000, 13 000, and 6000", *Canadian Journal of Microbiology*, 1995, v.41, pp. 316-322.

Payment, P.; Berube, A.; Perreault, D.; Armon, R.; and Trudel, M.; "Concentration of *Giardia lamblia* cysts, *Legionella pneumophila*, *Clostridium perfringens*, human enteric viruses, and coliphages from large volumes of drinking water, using a single filtration", *Canadian Journal of Microbiology*, 1989, v.35, pp. 932-935.

Pethig, R.; and Markx, G.H.; "Applications of dielectrophoresis in biotechnology", *Trends in Biotechnology*, 1997, v.15, pp. 426-432.

Qian, S.F.; Donnelly, M.; Schmelling, D.C.; Messner, M.; Linden, K.G.; and Cotton, C.; "Ultraviolet light inactivation of protozoa in drinking water: a Bayesian meta-analysis", *Water Research*, 2004, v.38, pp. 317-326.

Schnelle, T.; Muller, T.; Fiedler, S.; Shirley, S.G.; Ludwig, K.; Hermann, A.; and Fuhr, G.; "Trapping of Viruses in High-Frequency Electric Field Cages", *Naturwissenschaften*, 1996, v.86, pp. 172-176.

Suehiro, J.; Hamada, R.; Noutomi, D.; Shutou, M.; and Hara, M.; "Selective detection of viable bacteria using dielectrophoretic impedance measurement method", *Journal of Electrostatics*, 2003, v.57, pp. 157-168.

Suehiro, J.; and Zhou, G.; "Dielectroophoretic Filter for Separation and Recovery of Biological Cells in Water", *IEEE Transactions on Industry Applications*, 2003, v.39(5), pp. 1514-1521.

Suehiro, J.; Noutomi, D.; Shutou, M.; and Hara, M.; "Selective detection of specific bacteria using dielectrophoretic impedance measurement method combined with an antigen-antibody reaction", *Journal of Electrostatics*, 2003, v.58, pp. 229-246.

Belfort, G.; Rotem, Y.; and Katzenelson, E.; "Virus Concentration Using Hollow Fiber Membranes-II", *Water Research*, 1976, v.10, pp. 279-284.

Brink, L.E.S. and Romijn;D.J.; "Reducing the Protein Fouling of Polysulfone Surfaces and Polysulfone Ultrafiltration Membranes: Optimization of the Type of Presorbed Layer", *Desalination*, 1990, v.78, pp. 209-233.

Brown, A.P.; Betts, W.B.; Harrison, A.B.; and O'Neill, J.G.; "Evaluation of a dielectrophoretic bacterial counting technique", *Biosensors & Bioelectronics*, 1999, v.14(3), pp. 341-351.

Chou, C.; Tegenfeldt, J.O.; Bakajin, O.; Chan, S.S.; Cox, E.C.; Darnton, N.; Duke, T.; and Austin, R.H.; "Electrodeless Dielectrophoresis of Single- and Double-Stranded DNA", *Biophysical Journal*, 2002; v.83, pp. 2170-2179.

Chou, C.; and Zenhausern, F.; "Electrodeless Dielectrophoresis for Micro Total Analysis Systems," *IEEE Engineering in Medicine and Biology Magazine*, Nov./Dec. 2003, pp. 62-67.

Cummings, E.B.; and Singh, A.K.; "Dielectrophoresis in Microchips Containing Arrays of Insulating Posts: Theoretical and Experimental Results," Analytical Chemistry, 2003, v.75(18), pp. 4724-4731.

Cummings, E.B.; and Singh, A.K.; "Dielectrophoretic Trapping Without Embedded Electrodes," *SPIE: Conference on Microfluidic Devices and Systems III*, Santa Clara, CA, 2000, v.4177, pp. 164-173.

Dziewulslki, D.M.; Belfort, G.; "Virus Concentration from Water Using High-Rate Tangential—Flow Hollow Fiber Ultrafiltration," Water Science Technology, 1983, v.15, pp. 75-89.

Hill, V.R.; Polaczk, A.L.; Hahn, D.; Narayanan, J.; Cromeans, T.L.; Roberts, J.M.; and Amburgey, J.E.;. "Development of a Rapid Method for Simultaneous Recovery of Diverse Microbes in Drinking Water by Ultrafiltration with Sodium Polyphosphate and Surfactants," *Applied and Environmental Microbiology*, 2005, v.71(11), pp. 6878-6884.

Lapizco-Encinas, B.H.; Simmons, B.A.; Cummings, E.B.; and Fintschenko, Y.; "Dielectrophoretic Concentration and Separation of Live and Dead Bacteria in an Array of Insulators," *Analytical Chemistry*, 2004, v.76(6), pp. 1571-1579.

Lepesteur, M.; Blasdall, S.; and Ashbolt, N.J.; "Particle dispersion for further *Cryptosporidium* and *Giardia* detection by flow cytometry," *Letters in Applied Microbiology*, 2003, v.37, pp. 218-229.

Li, H.; and Bashir, R.; "Dielectrophoretic separation and manipulation of live and heat-treated cells of *Listeria* on microfabricated devices with interdigitated electrodes," *Sensors and Actuators B*, 2002, v.86(2-3), pp. 215-221.

Markx, G.H.; Talary, M.S.; and Pethig, R.; "Separation of viable and non-viable yeast using dielectrophoresis," *Journal of Biotechnology*, 1994, v.32, pp. 29-37.

Medoro, G.; Manaresi, N.; Leonardi, A.; Altomare, L., Tartagni,M.; and Guerrieri, R.; "A Lab-on-a-chip For Cell Detection and Manipulation," *Sensors*, Proceeding of the IEEE, Orlando, FL, Jun. 2002, pp. 472-477.

Morales-Morales, H.A.; Vidal, G.; Olszewski, J.; Rock, C.M.; Dasgupta, G.; Oshima, K.H.; and Smith, G.B.; "Optimization of a Reusable Hollow-Fiber Ultrafilter for Simultaneous Concentration of Enteric Bacteria, Protozoa, and Viruses from Water," *Applied and Environmental Microbiology*, 2003, v.69(7), pp. 4098-4102.

Muller, T.; Fiedler, S.; Schnelle, T.; Ludwig, K., Jung, H.; and Fuhr, G.; "High Frequency Electric Fields for Trapping of Viruses," *Biotechnology Techniques*, 1996, v.10(4), pp. 221-226.

Papo, A.; Piani, L., and Ricceri, R.; "Sodium tripolyphosphate and polyphosphate as dispersing agents for kaolin suspensions: rheological characterization," *Colloids and Surfaces A: Physiochemical and Engineering Aspects*, 2002, v.201, pp. 219-230.

Pohl, H. A.; and Crane, J. S.; "Dielectrophoresis of Cells," *Biophysical Journal*, 1971, v.11, pp. 711-727.

Pohl, H. A.; and Hawk, I.; "Separation of Living and Dead Cells by Dielectrophoresis," *Science*, 1966, v.152(3722), pp. 647-649.

Pohl, H.A.; "The Motion and Precipitation of Suspensoids in Divergent Electric Fields," *Journal of Applied Physics*, 1951, v.22(7), pp. 869-871.

Pohl, H.A.; "Some Effects of Nonuniform Fields on Dielectrics," *Journal of Applied Physics*, 1958, v.29(8), pp. 1182-1188.

Quinn, C.M.; Archer, G.P.; Betts, W.B.; and O'Neill, J.G; "Dose-dependent dielectrophoretic response of *Cryptosporidium* oocysts treated with ozone," *Letters of Applied Microbiology*, 1996, v.22, pp. 224-228.

Sharma, M.M.; Chang, Y.I.; and Yen, T.F.; "Reversible and Irreversible Surface Charge Modification of Bacteria for Facilitating Transport Through Porous Media," *Colloids and Surfaces*, 1985, v.16, pp. 193-206.

Suehiro, J.; Shutou, M.; Hatano, T.; and Hara, M.; "High sensitive detection of biological cells using dielectrophoretic impedance measurement method combined with electropermeabilization," *Sensors and Actuators B: Chemical*, 2003, v.96, pp. 144-151.

Zhou, G.; Imamura, M.; Suehiro, J.; and Hara, M.; "A Dielectrophoretic Filter for Separation and Collection of Fine Particles Suspended in Liquid," 37$^{th}$ Annual Meeting of the IEEE-Industry-Applications-Society, *Proceeding of the IEEE*, Pittsburgh, PA,: 2002, pp. 1404-1411.

* cited by examiner

CONCENTRATION AND SEPARATION OF BIOLOGICAL ORGANISMS BY ULTRAFILTRATION AND DIELECTROPHORESIS

CROSS REFERENCE TO RELATED APPLICATIONS

This application claims priority to, prior provisional U.S. Patent Application Ser. No. 60/705,933 originally filed Aug. 3, 2005 entitled "CONCENTRATION AND SEPARATION OF BIOLOGICAL ORGANISMS BY ULTRAFILTRATION AND DIELECTROPHORESIS" from which benefit is claimed.

STATEMENT OF GOVERNMENT SUPPORT

This invention was made pursuant to Contract No. DE-AC04-94AL85000 by the United States Department of Energy and Sandia Corporation for the operation of Sandia National Laboratories and with funding from the Centers for Disease Control and Prevention, an agency of the United States Government. Therefore, the U.S. Government has certain rights in this invention.

TECHNICAL FIELD

The present invention relates to the development of methods of monitoring the safety of the public water supply by linking two analytical techniques, ultrafiltration and insulator-based dielectrophoresis in series to achieve significant concentration of microbes and pathogens for analysis. In particular, this invention relates to methods for determining whether and to what extent a municipal source of water is contaminated with a pathogen. More specifically, the invention is drawn to a method for detecting the presence of *Cryptosporidium parvum* oocytes.

BACKGROUND

The simultaneous concentration and recovery of microbes in drinking water is a critical procedure for responding to potential water-related bioterrorism events, and also would be an important technique for cost-effective routine monitoring of drinking water quality. Simultaneous microbe recovery can be accomplished in large-volume (100+ L) water samples using ultrafiltration (hereinafter "UF"), although little published research is available that indicates what process conditions are effective for yielding high recovery efficiencies for viruses, bacteria, and parasites in a single water sample.

Ultrafiltration is a technique that can be utilized for the simultaneous concentration of water-borne microbes but is more readily known by the public as a medical technique (hemodialysis) for people with kidney failure, where ultrafilter "dialyzers" are used to mimic the filtration activity of the kidneys by filtering blood to remove excess water, salts and waste products while retaining blood cells and proteins. Ultrafilters have pore sizes small enough to separate particles from water, as well as molecules that are larger than the Molecular Weight Cut-Off (hereinafter "MWCO") of the ultrafilter. Ultrafilters typically have MWCOs in the 10,000-100,000 Dalton ("Da") range (i.e. 10 kDa-100 kDa). Molecules smaller than the MWCO, therefore, such as water molecules, salts and small organic compounds, will simply pass through an ultrafilter as "permeate" and will not be co-concentrated with larger molecules and particles.

Ultrafiltration has been investigated since the 1970s as a technique for the concentration of microbes in drinking water (Belfort, G., Rotem, Y., Katzenelson, E., "Virus concentration using hollow fiber membranes-ii." *Water Research*, 1976, v.10(4): pp. 279-284). In the early 1980s, tangential-flow hollow fiber UF was investigated and found to be effective for recovering viruses in large-volume (up to 100-L) of tap water samples (Dziewulski, D.M., Belfort, G., "Virus concentration from water using high-rate tangential-flow hollow fiber ultrafiltration," *Water Science and Technology*, 1983 v.15:75-89). More recently, research reported greater than 50% recoveries for bacteriophages, *E. coli* and *C. parvum* oocysts seeded into 10-L surface water samples (Morales-Morales, H., Vidal, G., Olszewski, J., Rock, C., Dasgupta, D., Oshima, K., Smith, G., "Optimization of a reusable hollow-fiber ultrafilter for simultaneous concentration of enteric bacteria, protozoa, and viruses from water," *Applied Environmental Microbiology*, 2003, v.69(7): pp. 4098-4102). While the simultaneous UF recovery results of Morales-Morales et al. were good, their technique relied on the use of a calf serum protocol to pretreat the ultrafilter membranes prior to filtration. For certain applications (e.g., rapid response, and field-based filtration), pre-treatment with calf serum may not be appropriate or practical due to the potential for contaminating microbial growth in filters pre-treated with calf serum.

Research conducted at the Centers for Disease Control and Prevention, National Center for Infectious Diseases (hereinafter "CDC") has shown that UF can be an effective technique for simultaneously concentrating viruses, bacteria, and parasites in 100 L samples of drinking water (Hill, V. R., Polaczyk A. L., Hahn D., Jothikumar N., Cromeans T. L., Roberts J. M., Amburgey J. E. "Development of a rapid method for simultaneously recovering microbes in drinking water using ultrafiltration with sodium polyphosphate and surfactants." *Applied Environmental Microbiology*, 2005, 71(11):6878-6884). Ultrafilters that can accommodate 100 L water samples at practical process times have holdup volumes that are at best 250 mL or more; these volumes are too large for sensitive molecular or immunological detection of pathogens. Therefore, although it is likely that a UF procedure can be effective for simultaneous microbe recovery, it is unlikely that UF techniques are capable of reducing sample volumes to levels (<10 mL) sufficient for detecting low concentrations of microbes in a water sample and/or screening of the separated microbes based on specific conductivity and size.

In contrast, insulator-based dielectrophoresis (hereinafter "iDEP") systems are known to be capable of capturing, concentrating, and separating microbes in very small (<1 to 10 mL) water samples. Cummings and Singh have demonstrated iDEP separation and trapping with polystyrene particles using DC electric fields and a variety of arrays of insulating posts (Cummings, E., Singh, A., "Dielectrophoretic trapping without embedded electrodes," *SPIE: Conference on Microfluidic Devices and Systems III*, 2000, Santa Clara, Calif., Proc. SPIE, 4177: pp. 164-173). Chou et al., demonstrated iDEP trapping of DNA molecules, *E. coli* cells and blood cells using insulating structures and AC electric fields (Chou, C., Tegenfeldt, J., Bakajin, O., Chan, S., Cox, E., Darnton, N., Duke, T., Austin, R., "Electrodeless dielectrophoresis of single- and double-stranded DNA," *Biophysical Journal*, 2002, v.83(4): pp. 2170-2179). Zhou et al., and Suehiro et al., used a channel filled with insulating glass beads and AC electric fields for separating and concentrating yeast cells in water (Zhou, G., Imamura, M., Suehiro, J., Hara, M., "A dielectrophoretic filter for separation and collection of fine particles suspended in liquid," 37*th Annual Meeting of the IEEE-Industry-Applications-Society*, 2002, Pittsburgh, Pa., Proc. IEEE: pp. 1404-1411; and Suehiro, J., Zhou, G., Imamura, M., Hara, M., "Dielectrophoretic filter for separation and recovery of biological cells in water," *IEEE Annual Meeting of the Industry-Applications-Society*, 2003, Pittsburgh, Pa., Proc. IEEE, v.39: pp. 1514-1521). Finally, Lapizco-Encinas, et al., have demonstrated the selective dielectrophoretic trapping and concentration of live and dead *E. coli* cells, the separation of four different species of live bacterial cells, and the concentration of spores and viruses in both glass and plastic chips (Lapizco-Encinas, B. H., Simmons, B. A., Cummings, E. B., Fintschenko, Y., "Dielectrophoretic concentration and separation of live and dead bacteria in an array of insulators," *Analytical Chemistry*, 2004, v.76(6): pp. 1571-1579; Lapizco-Encinas, B. H., Simmons, B. A., Cummings, E. B., Fintschenko, Y., "Insulator-based dielectrophoresis for the selective concentration and separation of live bacteria in water," *Electrophoresis*, 2004, v.25(10-11): pp. 1695-704; Lapizco-Encinas, B. H., Davalos, R., Simmons, B. A., Cummings, E. B., Fintschenko, Y., "An insulator-based (electrodeless) dielectrophoretic concentrator for microbes in water," *Journal of Microbiological Methods*, 2005, v.62(3), pp. 317-326; and Simmons, B. A., Lapizco-Encinas, B. H., Shediac, R., Hachman, J., Chames, J., Fiechtner, G., Cummings, E., Fintschenko, Y., "Polymeric insulating post electrodeless dielectrophoresis (iDEP) for the monitoring of water-borne pathogens," *The 8th International Conference on Miniaturized Systems for Chemistry and Life Sciences*, 2004, Malmo, Sweden, *Royal Society of Chemistry Special Publication*, 2005, v.297: pp. 171-173).

The combination of UF with iDEP, therefore, holds potential promise for allowing water utilities and associated industries to accurately assess low levels of pathogens in finished drinking water samples, whether due to natural or intentional contamination. This approach also could be applied to monitoring source water, industrial effluent, hospital discharge, and military water infrastructures for pathogens. Moreover, iDEP technology can separate live from dead/damaged microbes, thereby decreasing the chances of generating false-positive PCR results due to the presence of naked nucleic acid or non-viable microbes. In addition, the iDEP technique has the potential for sorting microbes according to type (e.g., viruses, bacteria, and parasites).

SUMMARY

To date, little research has been reported regarding technologies that are capable of real-time collection and analysis of water quality with respect to parasites, viruses and bacteria. It is believed that UF-iDEP technology would be successful in reliably detecting pathogens in large-scale applications. This is especially relevant as water utilities monitor for the presence of *Cryptosporidium* in an effort to determine Bin Classification as outlined in the proposed Long Term 2 Enhanced Surface Water Treatment Rule (hereinafter "LT2"), soon to be promulgated. This method of detection will provide a truer representation of source water quality by averaging over a larger data set, which could potentially prevent a water utility from being placed in a higher bin classification than would otherwise be necessary. In addition, real-time monitoring on finished treated water would provide validation of log removal determined by LT2. As a result, this new technology has the potential for not only saving considerable capital improvement expenditures as water utilities strive to comply with the inactivation requirements of LT2, but also to save operational costs by streamlining the monitoring process.

Considering the wide array of naturally occurring microbial agents that could be used to intentionally contaminate a drinking water system, a robust technique is needed to simultaneously concentrate viruses, bacteria, and parasites in water samples. In addition to its application for bioterrorism response, such a simultaneous recovery technique would be useful in the future for routine monitoring of drinking water quality. A method that can be used for analysis of a wide array of microbes of concern would streamline the microbial monitoring process, making it more efficient and effective.

It is therefore an objective of this invention to provide a method for simultaneously concentrating viruses, bacteria, and parasites in large-volume water samples with a high degree of efficiency and reliability.

Yet another objective of this invention is to provide microfluidic chips using iDEP for the capture and recovery of bacteria and viruses in drinking water samples initially concentrated using UF.

Still another objective is to provide techniques for optimizing an iDEP chip for the capture and recovery of protozoan parasites in drinking water samples initially concentrated using UF.

Yet another objective of this invention is to provide a method for simultaneously capturing and recovering viruses, bacteria, and parasites present in ultrafilter-concentrated drinking water samples.

Yet a further object of this invention is to extend the UF-iDEP technique to the capture of protozoan parasites such as for example, *Cryptosporidium parvum* and *Giardia intestinalis*, and generating microbial recovery efficiency data for the iDEP system as a stand-alone system and in conjunction with UF.

DETAILED DESCRIPTION OF THE EMBODIMENTS

Figure 1:
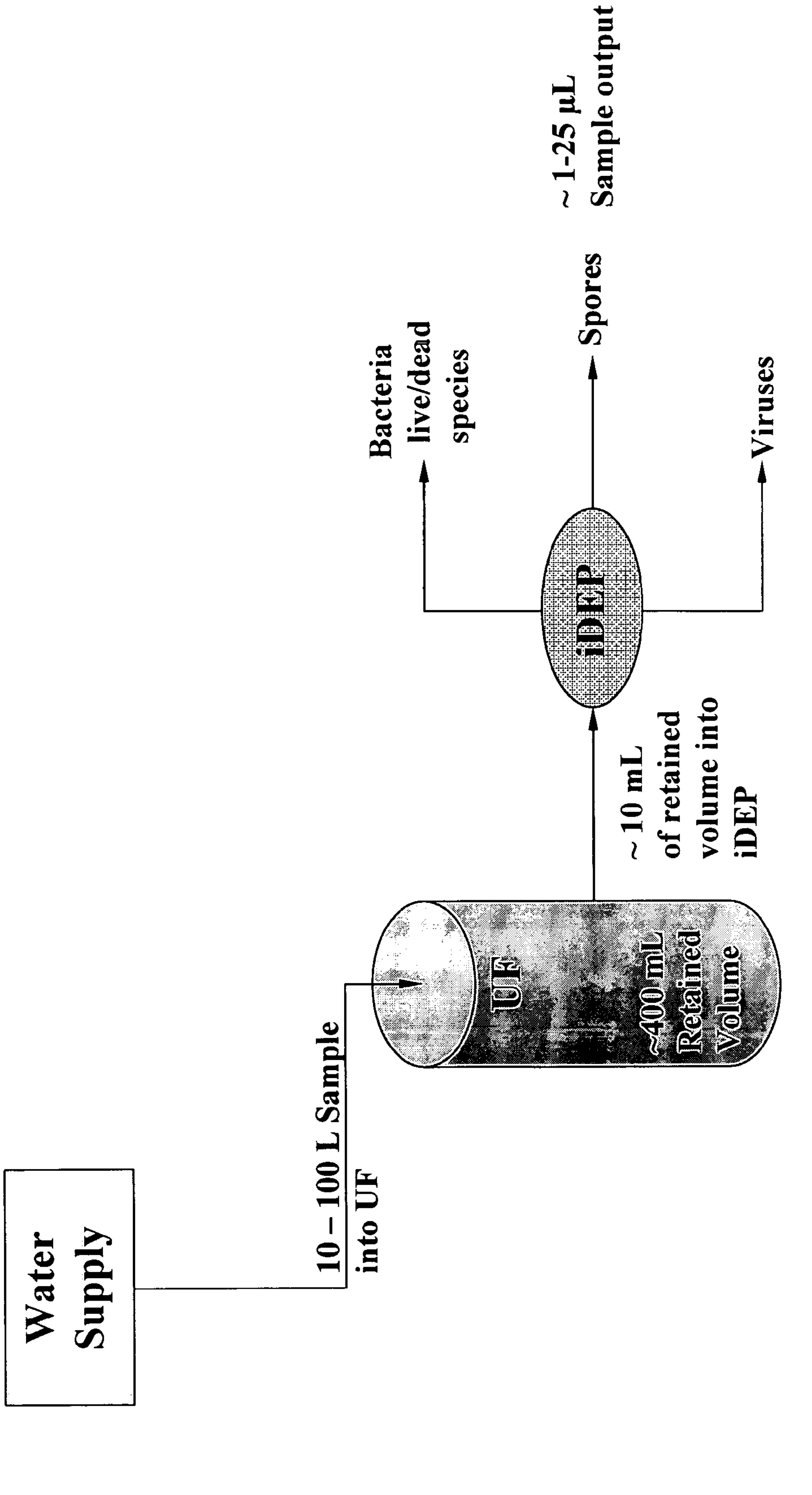
FIG. 1 shows a schematic depiction of the combined UF-iDEP system as applied to the monitoring of a given supply system.

The present invention contemplates using a hollow-fiber or a cross flow UF module as part of a filtration system that combines ultrafiltration and dielectrophoresis in an UF-iDEP system. While ultrafiltration is well known in the art (see U.S. Pat. No. 7,070,695, herein incorporated by reference) dielectrophoretic separation technology is relatively new and the methods for using it and the device structures are still evolving. Moreover, no one has yet suggested combining these two technologies wherein the former is used to provide a means for pre-concentrating a large volume of potentially contaminated water while the latter is used to separate and further concentrate species which may be present in the water sample in very low concentrations.

Any UF module having an MWCO value range of between 10 kDa to 300 kDa, an inlet or "feed" port, at least one primary outlet or "retentate" port for recirculating water contained within the UF module (and which also contains matter which cannot pass through the filter membranes), and a secondary outlet or "filtrate" port that allows filtered water to exit the system is believed useful as part of the UF-iDEP device described herein. Besides polysulfone, UF modules also may comprise polyethersulfone, cellulose triacetate, or other hydrophilic membranes and include those filtration units typically referred to as dialyzers with MWCO values such as 10 kDa or 20 kDa, and those typically referred to as hemoconcentrators with MWCO values such as 50, 65 or 100 kDa. In addition to hollow fiber membranes, there are also cross-flow UF systems using screens instead of hollow fibers. The concept is the same, i.e., recirculation under pressure to drive water molecules through a molecular-size filter, but retaining all particles. However, while hollow fiber membranes comprise a "tube" format, screen-based membranes comprise a "sheet." Examples are regenerated cellulose products with MWCO values of 10 kDa to 300 kDa available from Millipore Corporation (Bedford, Mass.) and cross-flow 10, 30 and 100 kDa silicone encapsulated cassettes available from Sartorius North America, Inc., (Edgewood, N.Y.).

In the method, these ultrafilters may be pre-treated with a chemical dispersant, such as sodium polyphosphate ("NaPP"), and/or a nonionic surfactant such as Tween 80, Tween 20, or Triton X-100, and/or an organic reagent such as calf serum, fetal bovine serum or beef extract. In the method, NaPP may also be added to water samples at concentrations such as 0.1% or 0.01% or 0.001% to minimize microbial adhesion during the concentration process. After the desired concentration factor is achieved, the UF-iDEP technique provides for the option of using an eluting solution to desorb microbes that may be adhering to the ultrafilter surfaces that further enhances iDEP device performance, such as solutions that contain nonionic surfactants. This eluting solution may be applied to the ultrafilter in a "backwash" mode wherein the solution is pumped through the filtrate port of the ultrafilter and collected through either the feed or retentate ports. The eluting solution may also be added to the recirculation loop and pumped through the hollow fibers of the ultrafilter in cross-flow mode. The eluting solution may consist of a chemical dispersant such as sodium polyphosphate, a nonionic surfactant such as Tween 80 or Tween 20 or Triton X-100, an organic reagent such as calf serum, fetal bovine serum, glycine, or beef extract, and/or an antifoaming reagent such as Antifoam A (Sigma-Aldrich). CDC has found that the UF technique can recover 50-95% of the following microbes in 100-L tap water samples: echovirus 1, MS2 bacteriophage, phi-X174 bacteriophage, *Salmonella, Escherichia coli, Enterococcus faecalis, Bacillus globigii* spores, *Bacillus anthracis* (Sterne strain) spores, *Yersinia pestis*, and *C. parvum* oocysts.

Dielectrophoresis (hereinafter "DEP"), is an electrostatic transport mechanism with a nonlinear dependence on electric field and has an enormous potential for water analysis since it can be used to simultaneously concentrate and separate microorganisms from water. A non-uniform electric field produces an unbalanced electrostatic force on the charge of a particle producing a net movement of the particle toward the region of higher electric field gradient. The resulting motion is called dielectrophoresis and can occur in either direct (hereinafter "DC") or alternating (hereinafter "AC") electric fields. There are two regimes of DEP that have the potential for particle concentration. The first regime (known as "streaming dielectrophoresis") occurs when DEP dominates diffusion, but does not overcome electrokinetic flow, so particles remain mobile. The second DEP regime (known as "trapping dielectrophoresis") which occurs when DEP overcomes diffusion and electrokinesis. In this second regime, particles are dielectrophoretically immobilized and can be significantly concentrated to nearly solid density.

The majority of the studies on dielectrophoretic manipulation of microorganisms have been carried out using electrodes. Some of these studies have focused on the separation of bacterial cells. Others have focused on dielectrophoretic collection and analysis of protozoan parasites using DEP. Quinn, et al. collected *Cryptosporidium parvum* oocysts by recirculating a suspension of ozonated oocysts through an electrode chamber by using a pump (Quinn, C., Archer, G., Betts, W., O'Neill, J., "Dose-dependent dielectrophoretic response of cryptosporidium oocysts treated with ozone," *Letters in Applied Microbiology*, 1996, v.22(3): pp. 224-228. Still others have focused on the dielectrophoretic separation of yeast cells as well as viruses and parasites.

The most common approach for carrying out DEP studies is to use AC electric fields and closely spaced electrode arrays to produce the nonuniform fields required for DEP to occur. The development of micro-fabrication techniques has enabled the construction of larges arrays of microelectrodes. Microelectrode array-based DEP systems, however, face application-limiting issues such as the decay of the electric field above the planar array electrodes which directly affects the DEP force exerted on the particles, reducing trapping efficiency. In addition, electrode degradation can occur at high applied electric fields.

iDEP offers a promising alternative to electrode-based DEP. In iDEP the nonuniform electric field is produced by an array of insulators, rather than an array of electrodes. Moreover, iDEP technology has the potential to be an efficient technique for further concentrating microbes in ultrafilter concentrates. Devices for iDEP can be made from insulating materials (e.g., plastics) that are less expensive and easier to handle, thus opening the possibility for high-throughput and large-volume devices. By utilizing iDEP, selective concentration can be achieved in a single automated device.

Little research has been reported regarding technologies that are capable of simultaneously concentrating viruses, bacteria and parasites in large-volume water samples with a high level of efficiency and reasonable processing times. For large-volume (>10-L) water samples, tangential flow ultrafiltration is a promising technique for simultaneously concentrating these diverse microbes into sample volumes of approximately 300 mL or less. Using hollow fiber ultrafilters, CDC researchers have been able to simultaneously recover viruses such as echovirus 1 and MS2 bacteriophage, bacteria such as *B. globigii* spores and *Salmonella enterica* subspecies enterica serovar Typhimurium and *Cryptosporidium parvum* oocysts with average recovery efficiencies of above 50% in 100-L tap water samples. The CDC UF protocol incorporates the use of chemical dispersants to minimize microbial adhesion to the ultrafilter fibers, as well as the use of an elution solution to desorb adhered microbes either through filter backwashing or cross-flow elution. This UF procedure is capable of concentrating 100 L of drinking water to <400 mL in less than 2 hours.

The lower limit of concentration for high-volume (~100 L) tangential flow ultrafilters, however, is approximately 250 mL, which represents volumes far larger than desirable for detection of low levels of pathogens in water samples. The iDEP technology is capable of concentrating viruses, bacteria and parasites in water samples using a DC electric field with electrodes placed at the inlet and outlet reservoirs. In the iDEP process, a nonuniform electric field is created across a microchannel using DC voltage. Microbes in water samples are trapped within the iDEP device as they flow through the electric field maintained above a threshold DC voltage. Using fluorescent microscopy, we have shown that bacterial cells and virus particles can be captured using iDEP. No other single sampling technique has similar potential for sorting microbes based on size and surface properties derived from large-volume water samples. While current prototypes of the iDEP microfluidic "chip" are designed to process water samples on the milliliter scale, the technology is scaleable to the level at which hundreds of milliliters could be processed.

A UF-iDEP system such as is shown schematically in FIG. 1 provides a system and method for sampling/detecting water-borne enteric microbes. The present embodiment is therefore comprised of a UF module and an iDEP module together with assorted valves and conduit to place each in fluid communication with the other. Additionally, the UF module typically comprises a filter membrane contained within a housing through which water is passed. By using the embodiment shown in FIG. 1, a large sample of source water (10 L-100 L) from a municipal treatment facility, for instance, may first be passed through a UF module where a portion of the sample in which particles carried in the inflowing water, and which are larger than the MWCO of the UF filter, are retained (the retentate) and collected. This "pre-concentrated" sample ("retentate") provided by the UF module comprises a volume of between about 250 mL and 400 mL. After the desired volume of source water has passed through the UF module, a small fraction of the water retained within the filter housing (about 10 mL) is passed to one or several microfluidic iDEP module(s) through a fluid manifold connected to a large number of microfluidic flow channels. Each of the separate iDEP channels, in turn, comprises a plurality of flow structures such as those disclosed in commonly owned U.S. Pat. No. 7,014,747 and U.S. patent application Ser. Nos. 10/176,322 and 10/969,137, herein incorporated by reference. These flow structures may comprise any useful element such as posts, prisms, polyhedrons, cylinders, or cones, and may have any useful cross-sectional shape such as a crescent, an ellipse, an oblate oval, a tear drop, a pear, a dumbbell, or a limacon. The flow structures may also comprise depressions in a substrate bold.

As the particles collected in the UF retentate sample portion pass into the iDEP module and around these flow structures, an electric field is established between the inlet and outlet ends of each flow channel and the particles within the flow channels are temporarily trapped by an electrical field. The electrical potential generates a dielectrophoretic field force which is adjusted to overcome the electrokinetic and hydrodynamic drag forces on the water moving through the electric field. The number of particles trapped in the field grows with time until the applied field is removed and thereby temporarily traps particles suspended in the pre-concentrated water sample. After a set period of time, the electric field can then be removed and the concentrated particles eluted out of the iDEP structures to provide a final analyte volume of about 25 μL or below which now can be analyzed by known methods such a fluorescent microscopy.

Figure 2A:
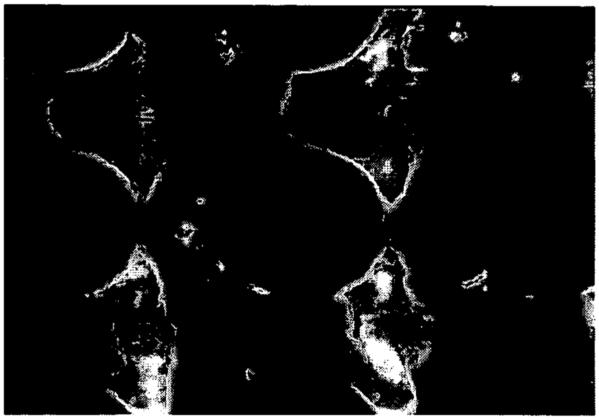
FIG. 2A shows the simultaneous concentration and separation of *E. coli* and *B. subtilis* bacteria at a mean applied field of 75 V/mm.
Figure 2B:
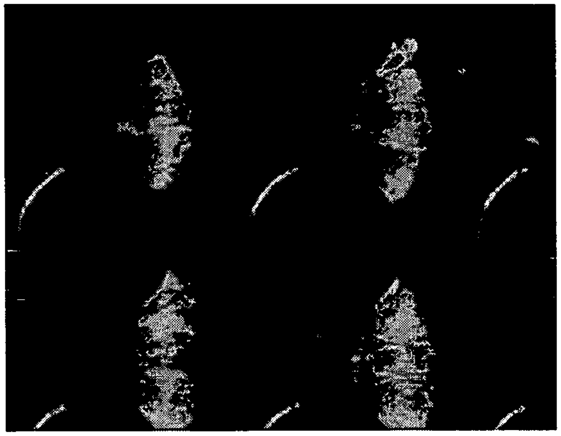
FIG. 2B shows the simultaneous concentration and separation of *E. coli* and *B. cereus* bacteria at a mean applied field of 75 V/mm.
Figure 2C:
FIG. 2C shows the simultaneous concentration and separation of *E. coli* and *B. megaterium* at 90V/mm. The inlet cell concentration is $3\times10^8$ cells/ml. *E. coli* and *Bacillus* bacteria cells are respectively labeled green and red. The flow direction is from right to left. The background electrolyte is deionized water. The circular posts in the square array are 10-μm tall, 150-μm in diameter, and on 200-μm centers.
Figure 3A:
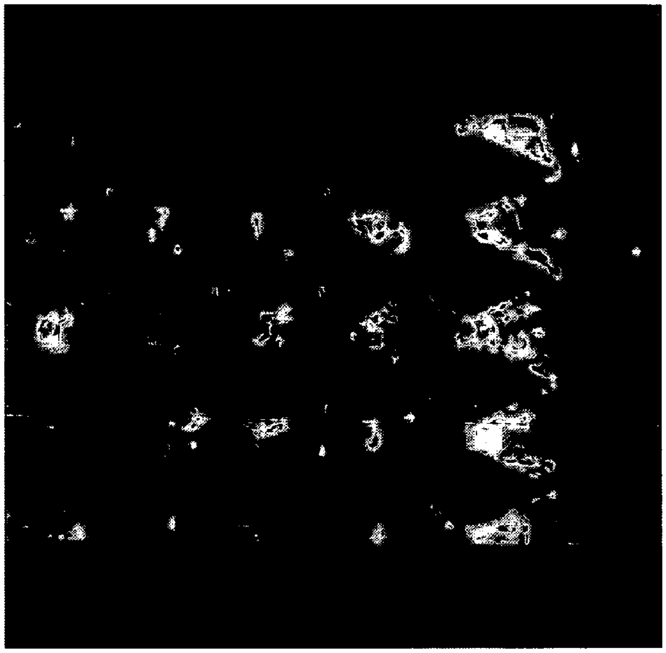
FIG. 3A shows dielectrophoretic trapping of *B. subtilis* spores. Spore concentration is a concentration of $2\times10^7$ spores/mL. Spores are labeled green. In this gray scale figure, spores appear white. Flow direction is from right to left. The background electrolyte is deionized water, pH=8, $\sigma$=2 μS/mm. The circular posts in the array are 10-μm tall, 200-μm in diameter, and on 250-μm centers. The mean applied electric field is 200 V/mm.
Figure 3B:
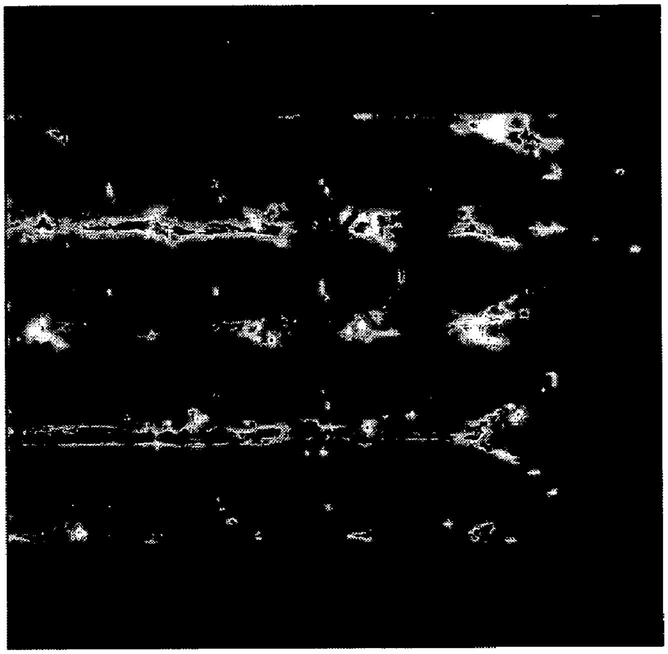
FIG. 3B shows dielectrophoretic release of *B. subtilis* spores.
Figure 4A:
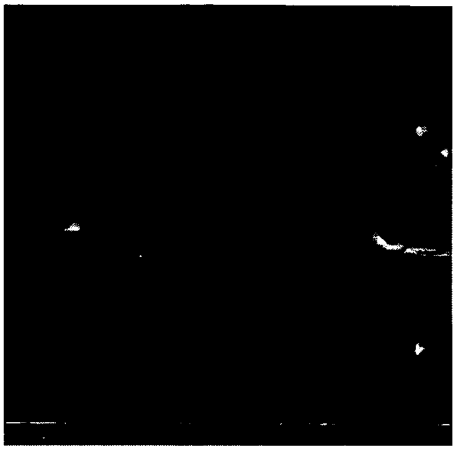
FIG. 4A shows streaming tobacco mosaic virus (hereinafter "TMV") in water since the applied electric field of 40 V/mm is not high enough to achieve trapping. Insulating post structures have the following dimensions: 200 μm in diameter, 250 μm center-to-center, 10 μm in height, made in glass. Flow is from right to left.
Figure 4B:
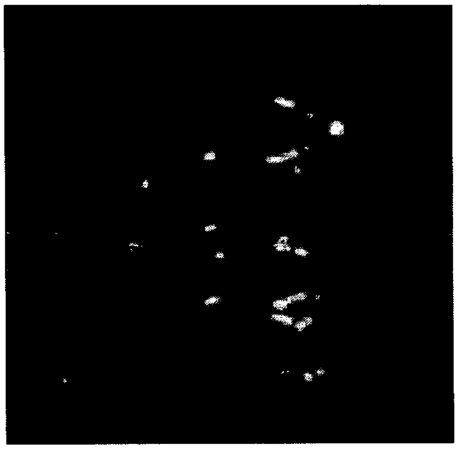
FIG. 4B shows dielectrophoretic trapping of TMV at E=80 V/mm.
Figure 4C:
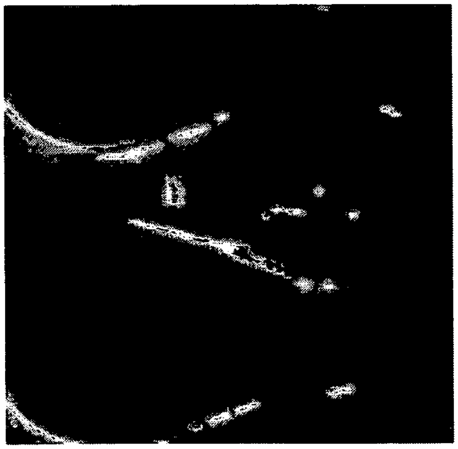
FIG. 4C shows a magnified view of FIG. 3B, showing dielectrophoretic trapping of TMV at E=80 V/mm.
Figure 5:
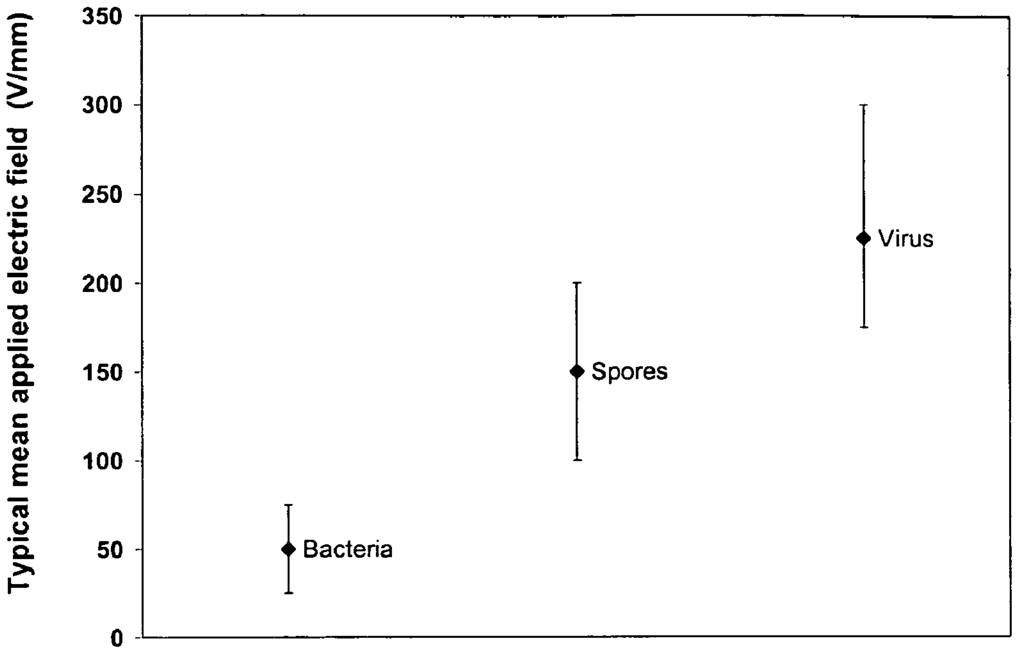
FIG. 5 shows a typical mean applied electric field (V/mm) to achieve dielectrophoretic trapping of the microorganisms studied in our system.

Currently, bacteria, spores, and viral particles have been demonstrated to trap and concentrate in DC electric fields examples of which are shown in FIGS. 2-4, respectively, (Lapizco-Encinas, et al., *Analytical Chemistry*, 2004, op. cit.; Lapizco-Encinas, et al., *Electrophoresis*, 2004, op. cit.; and Simmons, et al., *Royal Society of Chemistry*, 2005, op. cit). FIG. 5 shows the typical applied electric fields required to trap bacteria, spores, and viruses in our current micro iDEP device made from glass.

Figures 6A, 6B:
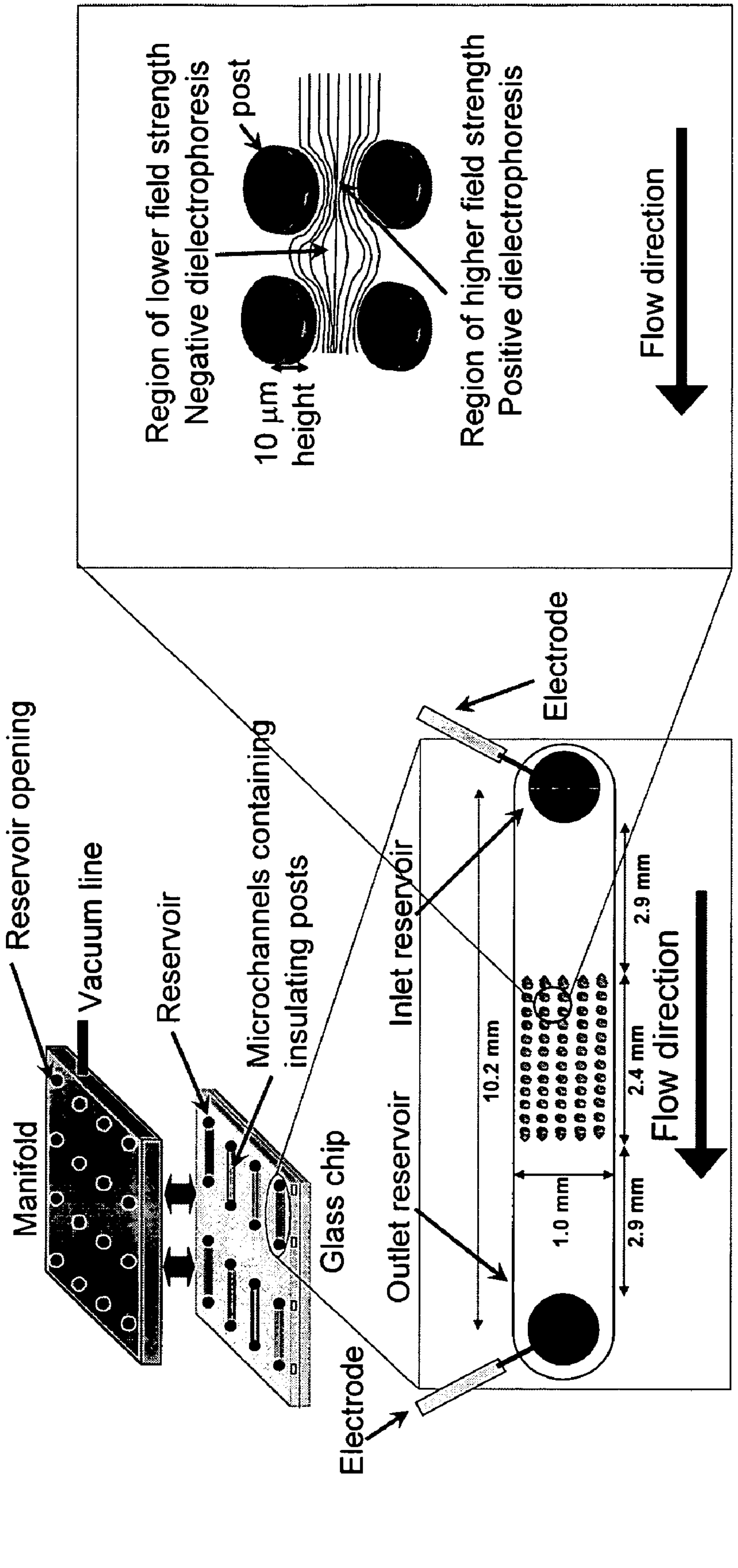
FIG. 6A shows a schematic plan-view of the iDEP chip-based set-up showing the manifold, the glass or polymer chip, and an enlargement of the flow microchannels.
FIG. 6B illustrates a cartoon showing how the insulating posts modify the field distribution.
Figure 7A:
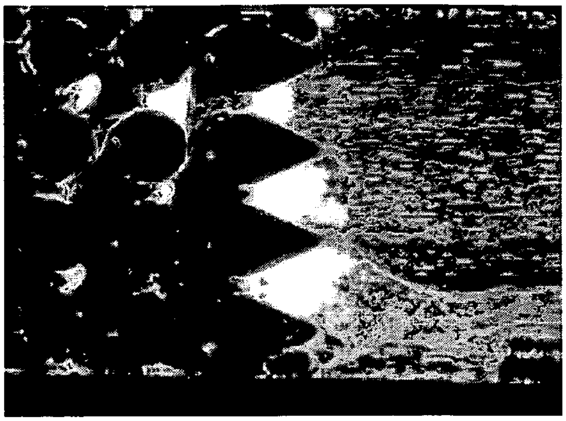
FIG. 7A shows the trapping and concentration of 1-μm inert polystyrene particles at a field of 100 V/mm using a ZEONOR® iDEP device.
Figure 7B:
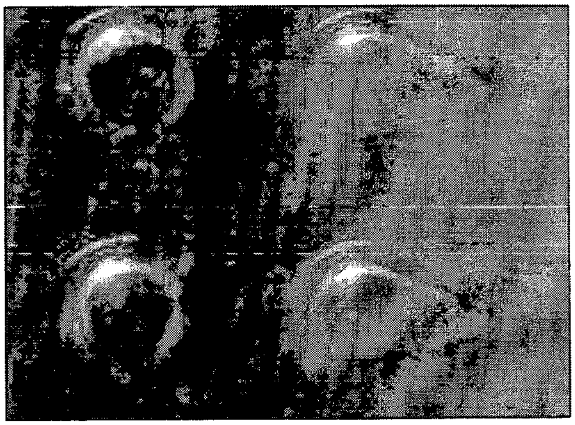
FIG. 7B shows the trapping and concentration of *E. coli* cells at a field of 60 V/mm using a ZEONOR® iDEP device.
Figure 7C:
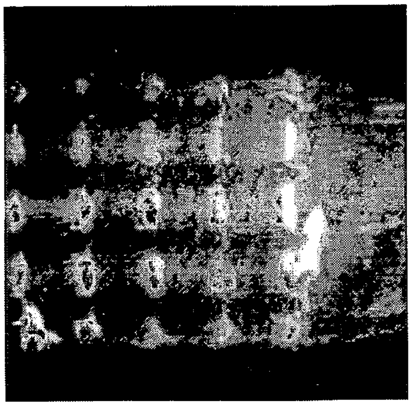
FIG. 7C shows the trapping and concentration of *B. thuringiensis* spores at a field of 80 V/mm.

FIGS. 6A and 6B show the current chip suitable for viral, spore, and bacterial particles. Channel depths are on the order of 10 microns. For parasites, a deeper channel (50-100 μm) and larger post features (250 to 500 μm center to center) will be used. Additionally, to prevent parasites and viral particles from nonspecifically adsorbing to the insulating material itself, the chips will be fabricated out of ZEONOR®, a polyolefin thermoplastic that we have found to be resistant to virus adsorption (ZEONOR® is a registered mark owned by the Nippon Zeon Co., Ltd. Corporation Japan, Tokyo, Japan; the product is available in the U.S. from Zeon Chemicals L.P., Louisville, Ky.). The SNL team has successfully fabricated polymeric-based chips for iDEP (Simmons, et al., 2004, op. cit). Concentration of inert particles, bacteria, and spores has been achieved using these polymeric-based iDEP devices. FIGS. 7A-C show the results obtained using a ZEONOR®-based iDEP device, wherein the circular posts shown in the square array are 50-μm tall, 150-μm in diameter, and on 200-μm centers.

Figure 8:
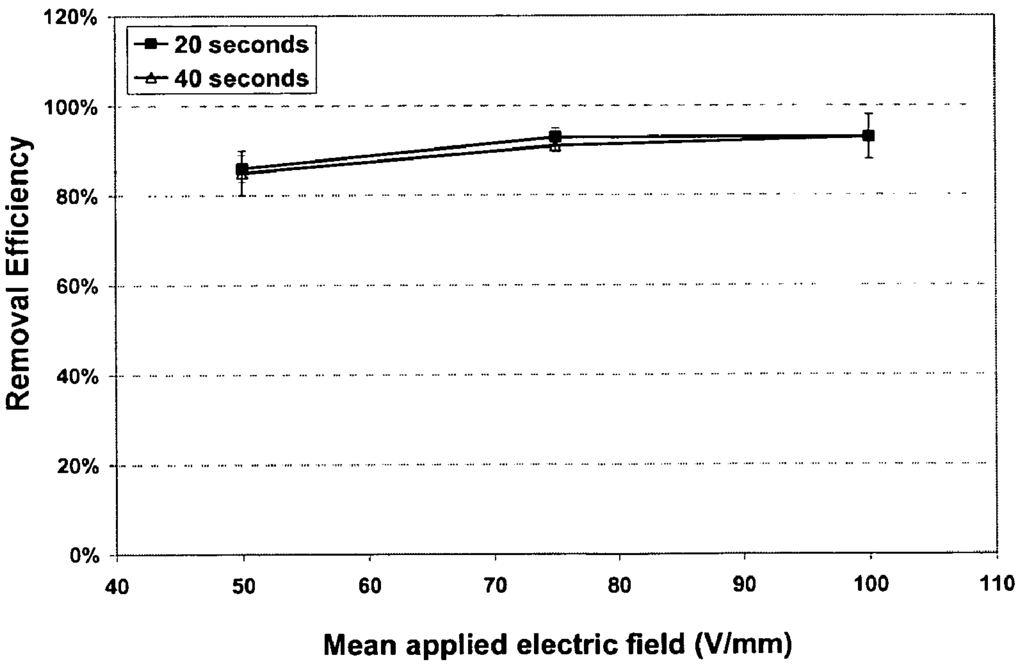
FIG. 8 shows the removal efficiency for *E. coli* cells with our current iDEP device made from glass.

Removal efficiency data has been obtained for *E. coli* cells suspended in deionized water and is shown in FIG. 8. The experimental results shown in FIG. 8 were conducted at applied mean electric fields of 50 V/mm, 75 V/mm and 100 V/mm and dwell times of 20 and 40 seconds, respectively. The effluent from the microdevice was analyzed by using fluorescence microscopy and removal efficiency values calculated. From FIG. 8 it is seen that removal efficiencies above 90% have been achieved using the glass microfluidic device design.

It is contemplated that the iDEP set-up for simultaneous microbe recovery will consist of three iDEP chips in series, each having a physical design and applied electric field for specific capture of each class of microbe (e.g., a parasite capture chip followed by a bacteria capture chip, followed by a virus capture chip).

Having thus described exemplary embodiments of the present invention, it should be noted by those skilled in the art that the foregoing disclosure is exemplary only and that various other alternatives, adaptations, and modifications may be made within the scope of the present invention. Accordingly, the present invention is not limited to the specific embodiments as illustrated herein.

Finally, to the extent necessary to understand or complete the disclosure of the present invention, all publications, patents, and patent applications mentioned herein are expressly incorporated by reference therein to the same extent as though each were individually so incorporated. A list of these references is appended to and herein merged with this document.

What is claimed is:

1. An apparatus for concentrating and separating particles in water, comprising:

an ultrafiltration ("UF") module comprising a feed port, at least one filtrate port, a retentate port, and a filtering media comprising a molecular weight cut-off ("MWCO") smaller than an average mean diameter of a particle of interest, wherein a volume of water comprising particles having an average mean diameter greater than said MWCO are retained and concentrated in said UF module;

an insulator-based dielectrophoresis ("iDEP") module comprising:

a plurality of fluid flow channels disposed on a substrate, wherein each of said fluid flow channels comprises a fluid inlet and a fluid outlet and a plurality of insulating flow structures disposed on said substrate, wherein each of said fluid inlets is separately connected to a first inlet manifold means, and wherein each of said fluid outlets is separately connected to a first outlet manifold means;

electrodes in electrical communication with the fluid inlet and outlet of each of the plurality of fluid flow channels, wherein the electrodes are positioned to generate a spatially non-uniform electric field across the plurality of insulating flow structures of each fluid flow channel, and wherein the spatially non-uniform electric field exerts a dielectrophoretic force on particles suspended in a quantity of water passing through each of the fluid flow channels; and power supply means connected to each of the electrodes to generate an electric field within said fluid flow channel; and conduit means disposed between the UF retentate port and the iDEP first inlet manifold means, wherein the UF module is placed in fluid communication with the iDEP module.

2. The apparatus of claim 1, wherein the filter media MWCO is between about 10 kDaltons and about 300 kDaltons.

3. The apparatus of claim 1, further comprising second and third iDEP modules, second inlet and outlet manifold means disposed between the first and second iDEP modules, and third inlet and outlet manifold means disposed between the second and third iDEP modules, wherein the first, second and third iDEP modules are connected in series and placed in fluid communication.

4. The device of claim 3, wherein the wherein the electric field maintained on electrodes comprising the third iDEP module is greater than the electric field maintained on electrodes comprising the second iDEP module, and wherein the electric field maintained on electrodes comprising the second iDEP module is greater than the electric field maintained on electrodes comprising the first iDEP module.

5. The device of claim 1, wherein said plurality of insulating flow structures are disposed in an ordered array.

6. The device of claim 1, wherein said plurality of insulating flow structures are disposed randomly.

7. The device of claims 5 or 6, wherein said plurality of insulating flow structures comprise one or more shapes.

8. The device of claim 7, wherein said one or more shapes are the same or different.

9. The device of claims 5 or 6, wherein said plurality of insulating flow structures comprise a plurality of post-like structures.

10. The device of claims 5 or 6, wherein said plurality of insulating flow structures comprise a plurality of depressions.

11. The device of claim 1, wherein the electric field comprises constant or variable components or both.

* * * * *